United States Patent [19]

Kelderman

[11] Patent Number: 4,676,171
[45] Date of Patent: Jun. 30, 1987

[54] TURNTABLE WITH SHOCK ABSORBING ROTATION LOCK

[76] Inventor: Gary L. Kelderman, R.R. 1, Oskaloosa, Iowa 52577

[21] Appl. No.: 809,424

[22] Filed: Dec. 16, 1985

[51] Int. Cl.⁴ ............................................. B60S 13/02
[52] U.S. Cl. ...................................... 104/45; 104/47
[58] Field of Search ............................... 104/35, 44–47; 410/1, 56, 57

[56] References Cited

U.S. PATENT DOCUMENTS

| | | | |
|---|---|---|---|
| 1,122,144 | 12/1914 | Meikle | 104/47 |
| 1,291,747 | 1/1919 | Brain | 104/44 |
| 1,853,980 | 4/1932 | Jordal | 104/44 |
| 2,080,596 | 5/1937 | Ash | 104/44 |
| 2,135,924 | 11/1938 | Toews | 104/41 |
| 2,952,221 | 9/1960 | Hobel | 104/41 |
| 3,536,214 | 10/1970 | Sorg | 414/537 |
| 3,583,326 | 6/1971 | Poissant | 104/35 |
| 3,728,971 | 4/1973 | Merrick | 104/44 |
| 4,562,774 | 1/1986 | Dehring | 104/44 X |

FOREIGN PATENT DOCUMENTS 1028546  7/1983  U.S.S.R. ................ 104/35

Primary Examiner—Robert B. Reeves
Assistant Examiner—Scott H. Werny
Attorney, Agent, or Firm—Henderson & Sturm

[57] ABSTRACT

A turntable for turning vehicles, including a base member adapted to be supported on a flat floor and having a platform rotatably disposed above the base member for supporting a vehicle thereon. Rollers are utilized to reduce friction and support the platform as it rolls around and the rollers roll along the floor. The roller mechanism and actuating mechanism are extremely compact in order to allow the turntable to be low enough to the floor so that ramps are not needed to get a vehicle thereon and tipping is not required. A rod is pivotally attached to the underside of the platform and has a cog operatively attached thereto with a free end thereon for engaging a first or second cog holding mechanism attached to each side respectively of the base member. A cog is engageable with the cog holding mechanism to hold the platform in place, but the cog is movable on a selective basis in order to allow the platform to rotate 180 degrees, whereupon the other cog holding mechanism will automatically engage the cog and hold the platform steady. Shock absorbing structures are provided for preventing damage to the cog when it engages the cog holding mechanisms.

7 Claims, 14 Drawing Figures

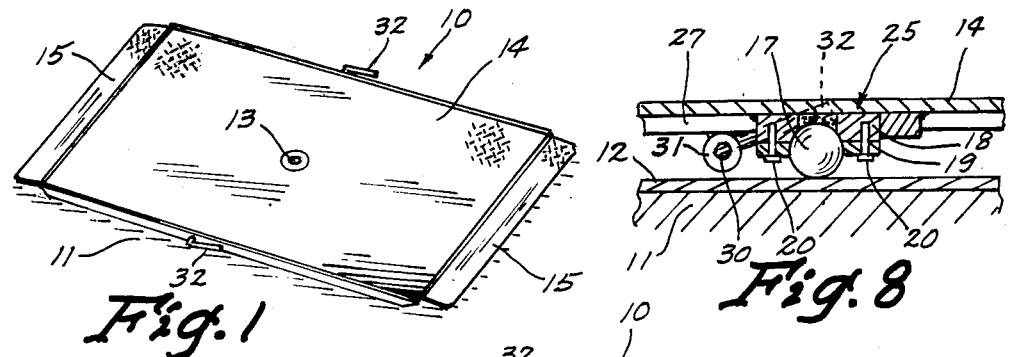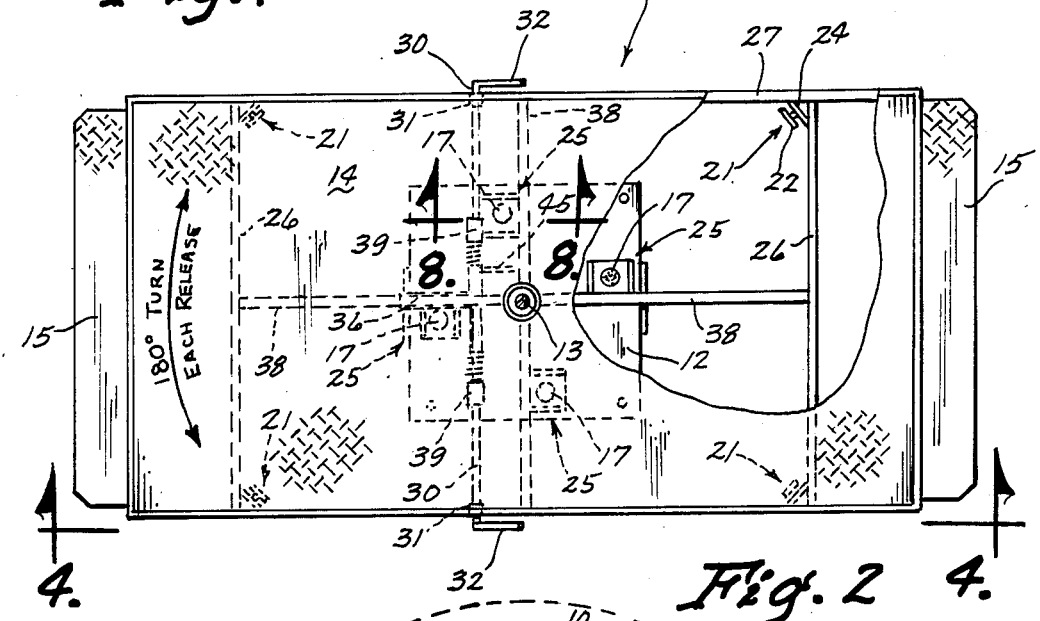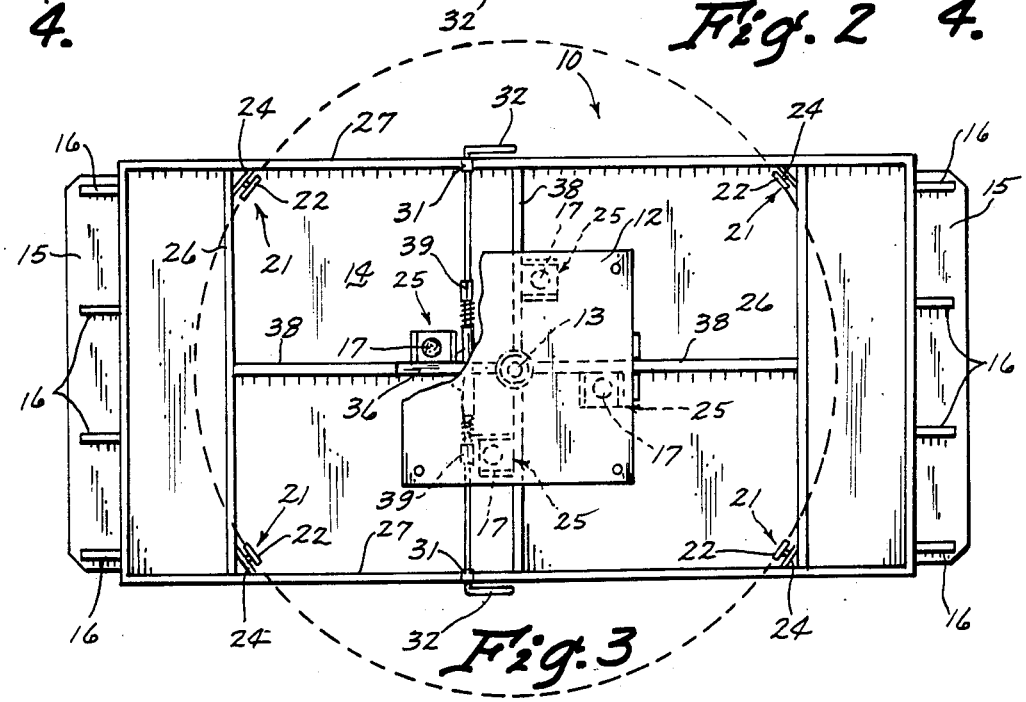

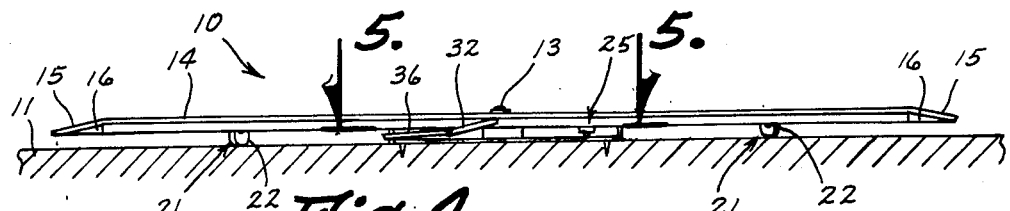
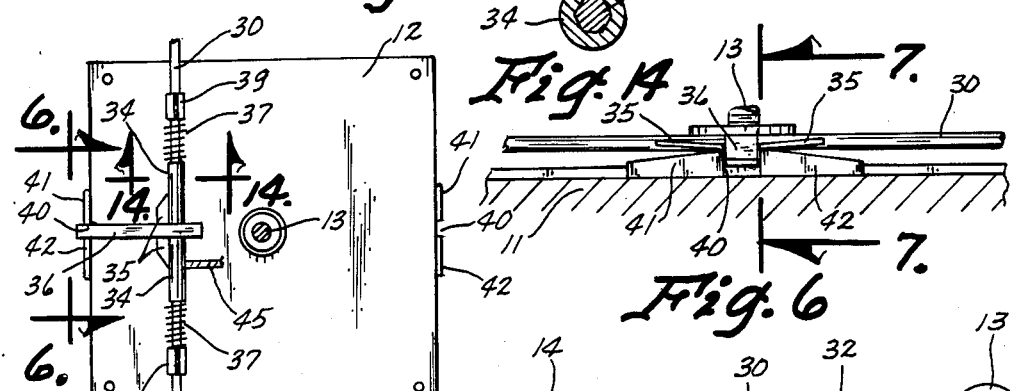
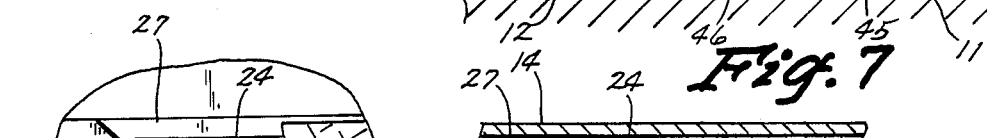
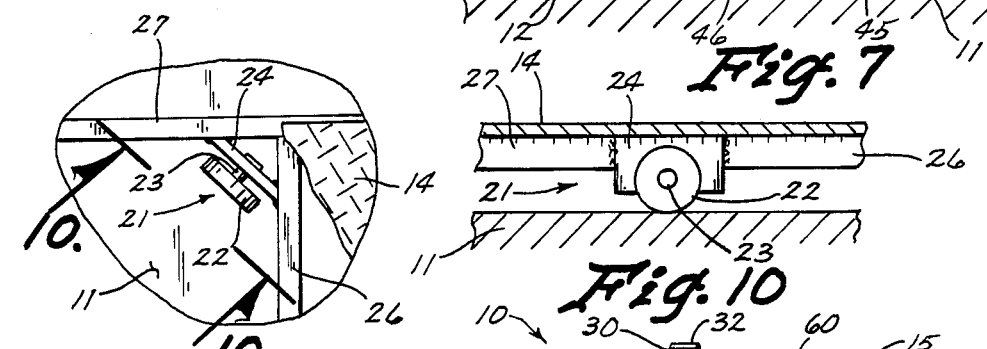
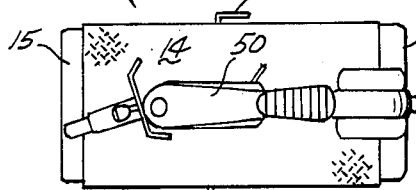
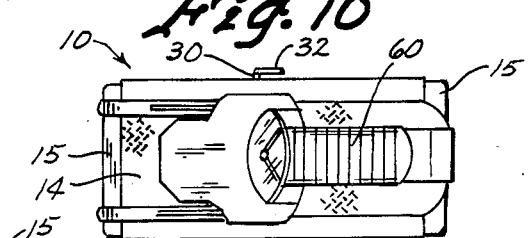
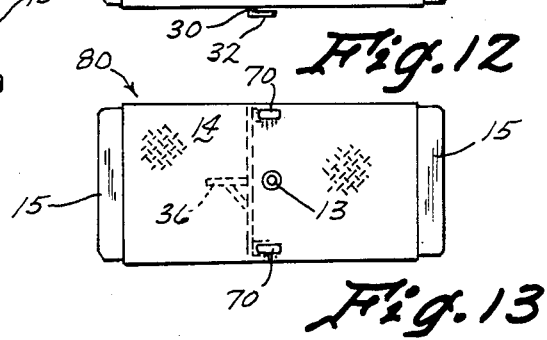

TURNTABLE WITH SHOCK ABSORBING ROTATION LOCK

TECHNICAL FIELD

The present invention relates to portable turntables, especially of the type for use with vehicles having no reverse gear, such as motorcycles or snowmobiles.

BACKGROUND ART

Owners of motorcycles and snowmobiles or other vehicles having no reverse gear have a problem from time to time after such vehicle has been parked in a garage or the like. Motorcycles, for example, must be manually turned around so that they can be driven out of a garage after having been driven into such garage. This is especially a problem when the motorcycle is large or the person trying to turn it around is small. Similarly, when a snowmobile is driven into a garage, then it is very difficult to get it turned around to be driven out of the garage.

One solution to the aforementioned problem is proposed in U.S. Pat. No. 3,583,326 to Poissant which proposes to use a turntable which is rather high, but which tips down in order to permit a snowmobile to be driven thereon. Such a mechanism is extremely difficult to use and the snowmobile operator is in a rather precarious position once the snowmobile comes to rest upon such turntable platform. Because of the complicated operation of such device, it has not come into considerable commercial usage since it was patented in 1971.

Another solution to the aforementioned problem is proposed in U.S. Pat. No. 3,728,971 to Merrick which proposes to use an auxiliary ramp to permit a snowmobile to move up on an elevated turntable. While this approach has some practical aspects thereto, still it would be preferable if this additional ramp element was not needed and for this reason it would be desirable to produce a turntable which could eliminate the need for such auxiliary ramp.

The two aforementioned ramp structures are in many respects two older approaches to turntables, such as U.S. Pat. No. 1,853,980 to Jordal, which utilizes a tipping turntable, U.S. Pat. No. 2,135,924 to Toews, patented in 1938, which has an elevated turntable for automobiles and U.S. Pat. No. 2,952,221 to Hobel patented in 1960, which is a turntable for automobiles which is somewhat complicated in nature. A still further turntable mounted on a trailer and having a ramp attached thereto is disclosed in U.S. Pat. No. 3,536,214 to Sorg et al. which was patented in 1970. It can be appreciated from inspecting the aforementioned patents that while the problem of turning a vehicle has been recognized for decades, there has not been a practical solution for those persons wishing to have a small compact unit for turning motorcycles or snowmobiles in their own home garage.

DISCLOSURE OF THE INVENTION

The present invention relates to a turntable for turning vehicles, including a base member adapted to be supported on a flat floor and having a platform rotatably disposed above the base member for supporting a vehicle thereon. Rollers are utilized to reduce friction and support the platform as it rolls around and the rollers roll along the floor. The roller mechanism and actuating mechanism are extremely compact in order to allow the turntable to be low enough to the floor so that ramps are not needed to get a vehicle thereon and tipping is not required. A rod is pivotally attached to the underside of the platform and has a cog operatively attached thereto with a free end thereon for engaging a first or second cog holding mechanism attached to each side respectively of the base member. A cog is engageable with the cog holding mechanism to hold the platform in place, but the cog is movable on a selective basis in order to allow the platform to rotate 180 degrees, whereupon the other cog holding mechanism will automatically engage the cog and hold the platform steady. Shock absorbing structures are provided for preventing damage to the cog when it engages the cog holding mechanisms.

An object of the present invention is to provide an improved turntable for small vehicles.

Another object of the present invention is to provide a mechanism which permits a turntable to be very low to the floor to eliminate the need for ramps or for the tipping of the turntable in order to allow a vehicle to be driven thereon easily.

A further object of the present invention is to provide a catch mechanism for a turntable of the aforementioned type which will hold a turntable in place in one position and then permit it to be rotated easily 180 degrees and then automatically stopped and be held in such stopped position until 180 degree turning is again desired.

A still further object of the present invention is to provide a shock absorbing structure for a turntable of the aforementioned type.

Other objects, advantages, and novel features of the present invention will be apparent from the following detailed description of the invention when considered in conjunction with the accompanying drawings.

BRIEF DESCRIPTION OF THE DRAWINGS

FIG. 1 shows a perspective view of a turntable constructed in accordance with the present invention and being shown on the floor of a garage or the like;

FIG. 2 is a top view of such turntable with portions broken away to show underlying parts and further having portions shown in dashed lines which underlie the top portions of the turntable;

FIG. 3 is a bottom view of the preferred embodiment of the present invention shown in FIGS. 1 and 2 and having a portion of the base member broken away to more clearly show the catch mechanism and friction reducing structures;

FIG. 4 is a side elevational view taken along line 4—4 of FIG. 2;

FIG. 5 is a cross sectional view taken along line 5—5 of FIG. 4;

FIG. 6 is an enlarged partial view taken along line 6—6 of FIG. 5;

FIG. 7 is an enlarged partial cross sectional view taken along line 7—7 of FIG. 6;

FIG. 8 is an enlarged partial cross sectional view taken along 8—8 of FIG. 2;

FIG. 9 is an enlarged elevational view of the friction reducing rollers with the platform broken away for example as shown in the top right corner of FIG. 2;

FIG. 10 is an enlarged partial cross sectional view taken along line 10—10 of FIG. 9;

FIG. 11 is a top elevational view of the preferred embodiment of FIGS. 1–10 having a motorcycle disposed thereon;

FIG. 12 is a view like FIG. 11, but having a snowmobile disposed on the turntable;

FIG. 13 is an alternate form of the present invention shown from a top elevational view having foot pads level with the top of the platform which can be depressed to actuate and unlock the mechanism of the present invention instead of using the levers which are utilized in the preferred embodiment of FIGS. 1–12; and FIG. 14 is an enlarged cross sectional view taken along line 14—14 of FIG. 5.

BEST MODES FOR CARRYING OUT THE INVENTION

Referring now to the drawings wherein like reference numerals designate identical or corresponding parts throughout the several views, FIG. 1 shows a turntable (10) constructed in accordance with the present invention and being supported on a floor (11). Referring to FIGS. 2 and 3 it is noted that a base member (12) is supported on the floor (11) and that this base member (12) has a bearing structure (13) centrally disposed therein for rotatably attaching a top platform (14) to the base member (12). Base member (12) has members (15) attached to each end thereof and supported by braces (16) for eliminating the need for separate ramps or the like to permit a vehicle to be driven up onto the top of the platform (14).

Referring to FIGS. 2, 3 and 8, it is noted that a ball bearing assembly (13) is provided which includes a ball (17) held to the platform (14) by members (18, 19) and fasteners (20). The ball is furthermore in contact with the base member (12) to reduce friction between the platform (14) and the base member (12) as the platform rotates around on top of the base member (12). It is noted that four of these assemblies (16) are attached to the platform (14) and these assemblies (16) can readily be seen in FIGS. 2 and 3, for example.

Referring now to FIGS. 2, 3, 9 and 10, it is noted that rollers (22) are rotatably attached by an axle (23) to braces (24) which are in turn attached to brace members (26 and 27) connected to the underside respectively of first, second, third and fourth outer peripheral portions of platform (14). These rollers (22) shall be generally referred to as roller assemblies (21) and four of such roller assemblies (21) are positioned on the peripheral edges of the platform (14) as can readily be seen in FIG. 3 showing how these rollers are aligned to follow around a dashed circle on the floor of which such turntable (10) is resting. Referring now to FIGS. 5, 4–7, it is noted that a hexagonally shaped rod (30) is rotatably attached to the platform (14) by welding tubes (31) (see FIG. 3) to the brace members (27) on the underside of the platform (14). Thus the bearings within the members (31) will permit the rod (30) to pivot when the handles (32) are pushed downwardly.

A slide member (34) which can best be seen in FIGS. 5 and 14 is slidable on the octagonal rod (30) because its interior shape is octagonal to conform to the shaft (30); but when the rod or shaft (30) is rotated, the slidable member (34) will rotate with the shaft (30). A lever or cog (36) is rigidly attached to the slidable member (34), such as by welding, and has small brace members (35) also welded to it nd to the slidable member (34) for added rigidity and strength. Compression springs (37) are disposed around portions of the hexagonal rod (30) and are in abutment with the members (39) and at one end thereof and are in abutment with the slide member (34) at the other ends thereof for absorbing shock as will be explained below. Members (39) are rigidly attached to rod (30).

Cog receiving slots (40) are formed on each end of the base member (12) by the use of tapered ramp members (41 and 42) as can readily be seen in FIGS. 5 and 6.

Looking at FIGS. 5 and 6 it is noted that the cog (36) is disposed within one of the slots (40) and that the cog (36) is held in this position by gravity and also by a spring (45) of a tension type which is attached to a lower portion of the slidable member (34) and to a lower part of the platform brace (38).

Since all of the operative elements of the preferred embodiments of FIGS. 1–12 have been described above, the operation of the invention can now be described. When it is described to utilize the turntable (10) as shown in FIG. 1, which is in a private garage for example, a motorcycle (50) as shown in FIG. 11 can merely be driven up onto the platform (14) thereof. Assume that the only door in the garage is towards the rear of the motorcycle (50).

When it is desired to drive the motorcycle (50) out of the garage, instead of manually having to move the motorcycle (50) on its wheels, one of the levers (32) merely needs to be depressed with a person's foot and this will turn and rotate the rod (30) which will in turn rotate the slidable member (34) and lift the free end of the cog member (36) out of the groove (40) shown in FIG. 6. Once that has been done, then with one foot on the platform (14) and one foot on the floor (11), the operator can push and turn the platform (14) about the center of bearing (13). When the platform is completely turned around such that the motorcycle (50) is facing the opposite direction than shown in FIG. 11, the cog (36) will have travelled up one of the ramps (41 and 42) and dropped into a slot (40) on the other side of the base member (12). When the cog member (36) drops into the slot (40), it would normally receive quite a shock as the entire platform stops, but since the compression springs (37) are provided as shown in FIG. 5, the member (34) will slide along the rod (30) to some extent against one of the springs (37) to cushion the shock and prevent the device from being damaged. It will be understood to those skilled in the art that the turntable can turn either clockwise or counterclockwise, whichever is most convenient to the operator of the turntable (10). This operation can be repeated as often as is necessary as the vehicle such as the motorcycle (50) is driven into a garage or the like and turned and driven out, etc.

Referring to FIG. 12, it is noted that a snowmobile (60) can also use the turntable device (10) exactly in the same manner as described above with respect to the motorcycle (50).

Referring to FIG. 13, it is noted that as an alternate form of the invention, pads (70) can be utilized in place of the levers (32) in that the pads (70) can be flush with the top of the platform (14), but connected rigidly to the rod (30) so that when a person steps down on the pad (70), the rod (30) will pivot, thereby lifting the cog (36) out of the slot (40) and allowing the platform (14) to pivot around 180 degrees to again be locked into the next slot (40).

Accordingly, it will be appreciated that the preferred embodiments described above do indeed accomplish all of the aforementioned objects. It is therefore to be understood that, within the scope of the appended claims, the invention may be practised otherwise than as specifically described.

I claim:

1. A turntable for turning vehicles comprising:

a base member supported entirely on top of a flat floor;

platform means disposed above said base member and being larger than said base member for supporting a vehicle thereon, said platform means having first, second, third and fourth outer peripheral portions;

means for rotatably attaching said platform means to said base member along a vertical axis;

a first floor engaging roller rotatably attached to a lower part of said first outer peripheral portion of said platform means along a first horizontal axis;

a second floor engaging roller rotatably attached to a lower part of said second outer peripheral portion of said platform means along a second horizontal axis transversely disposed with respect to said first horizontal axis;

a third floor engaging roller rotatably attached to a lower part of said third outer peripheral portion of said platform means along a horizontal axis;

a rod pivotally attached to one lower side of said platform means;

a cog operatively attached at one end thereof to an intermediate portion of said rod, and having a free end at the other end of said cog;

first cog holding means attached to one end of said base member for selectively receiving the free end of said cog therein to selectively prevent rotation of said platform means with respect to said base member when said free end of said cog is in said first cog holding means, said first cog holding means including means for forming a first upwardly facing slot for receiving the free end of said cog;

second cog holding means attached to the other end of said base member for selectively receiving the free end of said cog therein to selectively prevent rotation of said platform means with respect to said base member when said free end of said cog is in said second cog holding means, said second cog holding means including means for forming a second upwardly facing slot for receiving the free end of said cog;

biasing means operably attached to said rod for causing said free end of said cog to be biased downwardly;

means operably attached to said rod for selectively moving said free end of said cog upwardly to cause disengagement from said first or second cog holding means for permitting said platform means to rotate when said free end of said cog is in the upward position thereof;

first ramp means disposed on each side of said first slot for guiding said free end of said cog upwardly towards said first slot when said platform means is rotated in one rotary direction or the other;

second ramp means disposed on each side of said second slot for guiding said free end of said cog upwardly towards said second slot when said platform means is rotated in one rotary direction or the other;

a slide member slidably disposed on said rod, said cog being operatively rigidly attached to said slide member;

means for preventing rotation of said slide member with respect to said rod;

compression spring means disposed around a first portion of said rod and in operative abutment with one end of said slide member for absorbing shock when said cog engages one of said first or second cog holding means; and a second compression spring means disposed around a second portion of said rod and in operative abutment with the other end of said slide member for absorbing shock when said cog engages one of said first or second cog holding means.

2. The turntable of claim 1 including a fourth floor engaging roller rotatably attached along a horizontal axis to a lower portion of said fourth outer peripheral portion of said platform means.

3. The turntable of claim 2 wherein the horizontal axis of rotation of the first and third floor engaging rollers are in alignment.

4. The turntable of claim 3 wherein the horizontal axis of rotation of the second and fourth floor engaging rollers are in alignment.

5. The turntable of claim 4 wherein said first, second, third and fourth floor engaging rollers are each spaced the same distance from said vertical axis of rotation of the platform means.

6. The turntable of claim 1 wherein said biasing means comprises a tension spring attached at one end thereof to said slide member and operatively attached to said platform means at the other end thereof.

7. The turntable of claim 1 wherein said means for rotatably attaching said platform means to said base member includes roller ball friction reducing means operatively attached to said platform means and in rolling engagement with said base member.

* * * * *